Feb. 24, 1959  M. M. KAHN  2,874,723
FLEXIBLE HOSE

Filed Feb. 27, 1957  2 Sheets-Sheet 1

INVENTOR
MARVIN M. KAHN
BY *Philip G. Hilbert*
ATTORNEY

Feb. 24, 1959     M. M. KAHN     2,874,723
FLEXIBLE HOSE

Filed Feb. 27, 1957     2 Sheets-Sheet 2

INVENTOR
MARVIN M. KAHN
BY *Philip G. Hilbert*
ATTORNEY

United States Patent Office  2,874,723
Patented Feb. 24, 1959

2,874,723

FLEXIBLE HOSE

Marvin M. Kahn, Trenton, N. J., assignor to The Acme-Hamilton Manufacturing Corp., New York, N. Y., a corporation of Delaware Application February 27, 1957, Serial No. 642,744

18 Claims. (Cl. 138—56)

This invention relates to flexible hose, together with methods and machines for making the same. More particularly, the invention concerns flexible conduits made from thermoplastic materials, such as synthetic resins, elastomers and the like, in association with wire reinforcements.

In applicant's copending application Ser. No. 473,789 filed December 8, 1954, now Patent No. 2,798,508, there is shown flexible hose made from thermoplastic synthetic resin in tape form, where the tape is helically wound on a mandrel together with a reinforcing wire in interleaved relation to overlapping portions of the tape. Further, a helically wound tensioned tie member of thermoplastic material overlies the lapped portions of the tape and is disposed between successive convolutions of the reinforcing wire. The thus formed assembly is heated to fuse the superposed portions of thermoplastic material into an integrated structure with the reinforcing wire embedded therein.

It has been found that an improved flexible hose structure may be formed from helically wound synthetic resin tape and an interleaved wire helix, omitting the tie member described in application Ser. No. 473,789. To this end, the thermoplastic tape is manipulated as it is being wound in helical form to closely conform the same to the convolutions of the wire helix and thereby producing a well integrated structure after fusion of the overlapped tape portions.

An object of this invention is to provide an improved flexible hose made from thermoplastic tape and reinforcing wire wherein wire and tape are helically wound together on a mandrel to interleave the wire convolutions with overlapping portions of tape, the tape being tensioned as it is being wound, and further, the tape is continuously distorted between the edges thereof to give the same a substantially U-shaped transverse cross section immediately in advance of the contact of the tape with the mandrel.

A further object of this invention is to provide an improved method of forming flexible hose from thermoplastic tape and reinforcing wire, where both tape and wire are fed to a rotating mandrel in a manner to helically wind tape and wire in interleaved relation, the tape being fed under tension, and further, being engaged with a tool which continuously deflects an intermediate portion of the tape downwardly out of the plane thereof, at a point slightly in advance of the rotating mandrel.

Yet another object of this invention is to provide an improved machine for making flexible hose from thermoplastic tape and reinforcing wire, which includes a rotating mandrel on which tape and wire are helically wound in interleaved relation, together with means adjacent the mandrel for continuously deflecting at least one central portion of the moving tape, downwardly out of the plane of the tape.

Still another object of this invention is to provide an improved flexible hose made from helically wound thermoplastic tape and reinforcing wire in interleaved relation, the wire being formed of a metal or metal alloy which gives the wire maximum cross section for a given unit weight thereof, and further, which has the property of setting to a proper resiliency when the hose assembly is heated to fusibly integrate the tape convolutions.

Other objects of this invention will in part be obvious and in part hereinafter pointed out.

In the drawings, Fig. 1 is a top plan view of a machine embodying the invention;

Figure 1:
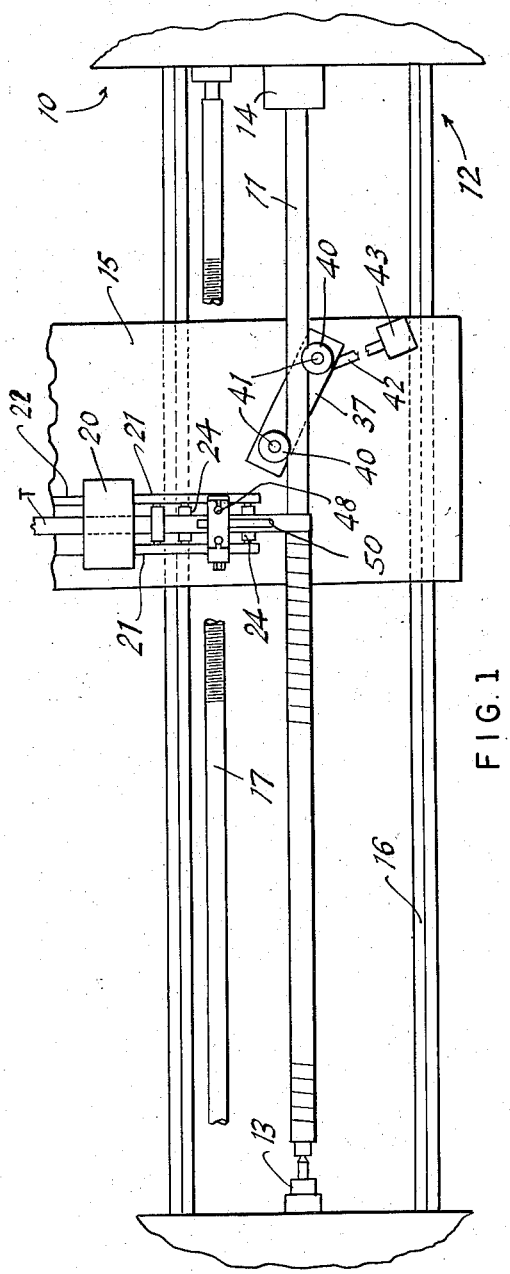
Figure 4:
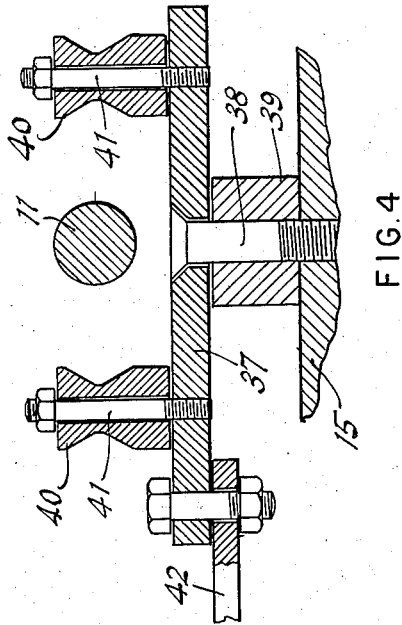
Fig. 4 is an elevational view in section of the mandrel stabilizing means.
Figure 2:
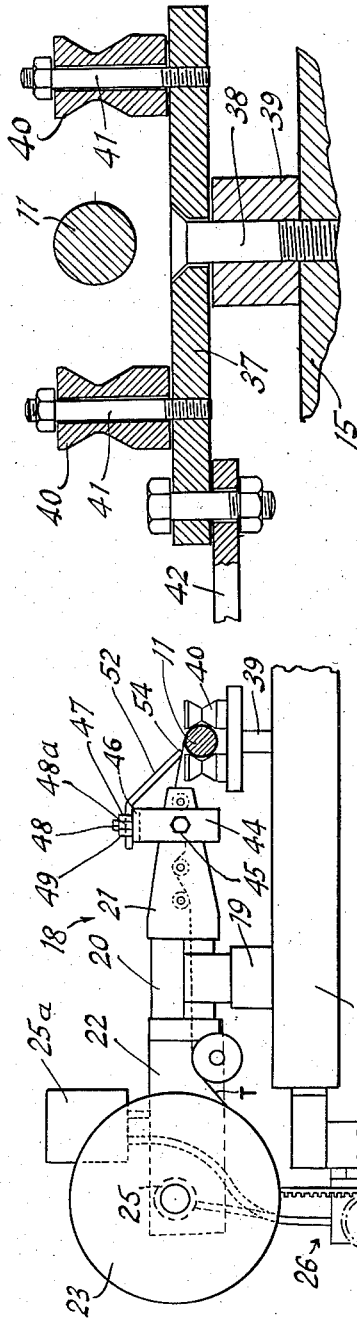
Fig. 2 is a transverse elevational view of a portion thereof.

Referring in detail to the drawing, 10 designates a machine embodying the invention, for making the novel flexible hose. The same comprises essentially a cylindrical metal mandrel 11 arranged for rotation in a turning lathe generally indicated at 12, the mandrel 11 being mounted in the usual tail stock 13 and head stock 14 of the lathe.

A carriage 15 is mounted transversely of the bed 16 of lathe 12 for longitudinal movement by means of lead screw 17. On carriage 15 there is mounted a tape feeder head generally indicated at 18, for feeding tape T to mandrel 11 and winding the tape helically about the rotating mandrel. The lead screw 17 and mandrel 11 are arranged for rotation on lathe 12 by suitable means, not shown, all in a manner known in the art.

The tape feeder head 18 comprises a standard 19 fixed to carriage 15, to which is attached a horizontally disposed hollow member 20. A pair of parallel arms 21 extend from one side of member 20 towards mandrel 11. A bracket 22 extends from the other side of member 20 and a tape supply roll 23 of tape T is rotatably mounted on said bracket. Tape T passes from roll 23 through member 20 and is threaded through guide rollers 24 mounted between arms 21.

As mandrel 11 is rotated, tape T is helically wrapped about the same. Tension on the tape is maintained at a predetermined value by magnetic brake means 25, with electrical control means for the brake at 25a. Furthermore, the reduction in diameter of supply roll 23 is continuously sensed to operate electrical control means 26, which in turn compensates control means 25a accordingly. Thus, tape T is helically wrapped about mandrel 11 with a uniform tension at all times.

As tape T is being helically wrapped about mandrel 11, a reinforcing wire W is continuously pulled from a supply reel, not shown, and wound helically in interleaved relation to overlapping portions of tape T. For this purpose, there is provided wire guide means generally indicated at 27 and comprising a block 28 secured to carriage 15 and formed with a horizontal bore 29 for passing wire W; a roller 30 circumferentially grooved at 31 located adjacent block 28 and mounted on an arm 32 extending from a standard 33 fixed to carriage 15; and a pair of guide jaws 34 interconnected by screws 35 and mounted on standard 33 by screws 36. Thus, wire W moving horizontally along the length of lathe bed 16, through the bore 29 of block 28, passes around roller 30 in the groove 31 thereof, up between jaws 34 and between overlapping portions of tape T as the same is being wrapped about mandrel 11.

Inasmuch as mandrel 11 may be of substantial length, means is provided for stablizing the same during rotation to prevent lateral deflection from its true axial position, particularly at points where the tape T and wire W are being helically wrapped about said mandrel. To this end, there is mounted on carriage 15, a horizontally disposed swivel plate 37 by means of an upright swivel bearing 38, with a spacer block 39 between the plate and carriage. On plate 37 there is mounted a pair of spaced, spool-like members 40 on spindles 41.

The plate 37 is located on carriage 15 so that members 40 may be disposed on opposite sides of mandrel 11 and may rotatably engage the same upon swivelled movement of the plate 37 by means of an arm 42 pivotally connected to the plate and actuated by a suitable pneumatic mechanism indicated at 43 and operative to lock plate 37 in selected positions thereof.

Means is provided for continuously depressing at least one intermediate longitudinal zone in tape T as the same moves under tension between the outermost guide roller 24 and mandrel 11. For this purpose, there is mounted on one arm 21 a right angle bracket 44 by a screw 45. The horizontal arm 46 of bracket 44 extends over arms 21 and carriers a holder member 47 fastened to arm 46 by screws 48. Member 47 is transversely slotted on the bottom edge thereof, as at 49 to receive therein an angular depresser member 50; the rear portion 51 of member 50 being received in slot 49 and clamped against bracket arm 46.

The depresser member 50 further includes a downwardly inclined finger portion 52 having its terminal end rounded as at 53 and 54. It will be apparent that member 50 may be moved to various adjusted positions through suitable angular movement of bracket 44 and shift of portion 51 thereof in holder member 47.

In using machine 10, mandrel 11 is continuously rotated and the starting end of tape T led from supply roll 23 and threaded through guide rollers 24, it suitably secured in place on one end of the mandrel, the carriage 15 being appropriately located for the purpose. As the mandrel 11 rotates, tape T will be pulled from roll 23 under uniform, predetermined tension and helically wound about the mandrel, as carriage 15 moves longitudinally through operation of lead screw 17. The amount of overlap of the successive convolutions of tape T is predetermined in a manner known in the art.

Figure 5:
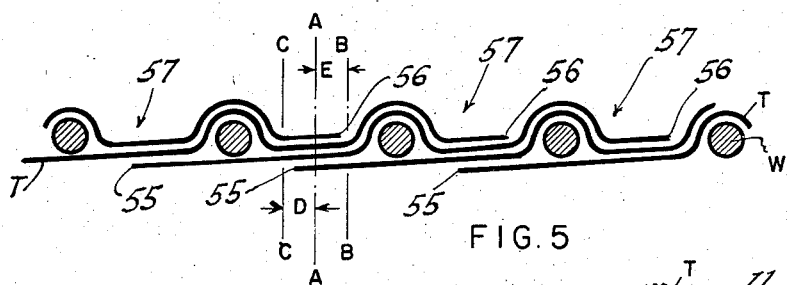
Fig. 5 is a diagrammatic representation of the overlapping turns of the helically wound tape and wire forming the flexible hose of the invention.

Simultaneously, wire W moving from its supply roll, is also helically wound about mandrel 11, being interleaved with the overlapping portions of tape T. As indicated in Fig. 5, the tape T may be of a selected width and the turns of wire W of a selected axial spacing which brings one layer of tape under each turn of wire W and two layers of tape over each turn of wire.

The wire W moves through the bore 29 of block 28, around grooved roller 30 and between guide jaws 34 into proper alignment with the turns of tape T. Thus the wire reinforcement for the flexible hose is helically wound in situ.

Figure 3:
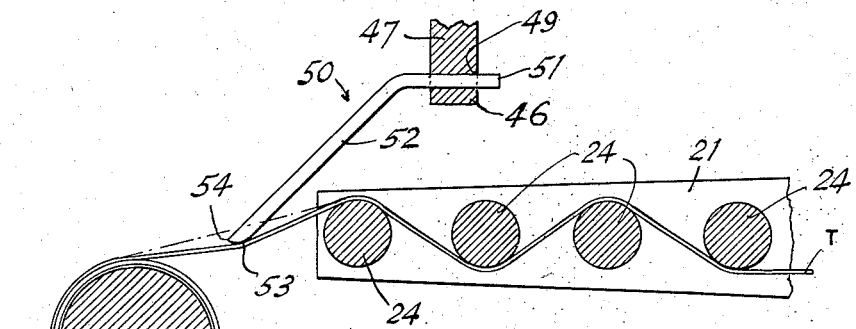
Fig. 3 is a diagrammatic representation of the tape feed and wire feed portions of the machine.

As shown in Fig. 3, the moving tape T is engaged by the terminal end 53 of depresser finger 52 in a manner to continuously depress an intermediate portion thereof, as the tape is about to pass about mandrel 11. Holder member 47 may be shifted laterally on bracket 44 and locked in place by means of screws 48 passing through the vertical end slots 48a in said holder member, thereby properly positioning the depresser member 50 in respect to the lateral dimension of tape T and the relative disposition of the turns of wire W. The amount of downward deflection of the intermediate portion of tape T may be regulated by angular adjustment of bracket 44.

It has been found that through use of depresser member 50, the finger 52 thereof being aligned with the valleys of the corrugations formed in the hose as the same is composited from tape T and wire W on mandrel 11, results in a well integrated assembly of tape and wire, with the tape portions overlying the turns of wire W closely conforming thereto.

Tape T may be formed of a synthetic, thermoplastic resin or elastomer such as vinyl copolymers, vinylidene chloride, polystyrene, polyvinyl chloride, polyvinyl alcohol, polyethylene, butadiene-styrene copolymers and butadiene-acrylonitrile copolymers.

The wire W may be formed from hard drawn wrought aluminum alloys such as 5056 S-H18 or H19. With this type of wire, the overall weight of the hose is substantially reduced yet retaining maximum reinforcing values. Furthermore, with a low unit weight of the wire W, the diameter thereof may be increased to give increased depth to the corrugation formed during the manufacture of the hose, thereby attaining improved flexibility characteristics. Finally, the aluminum alloy wire may be formed into the required helical form directly as the hose is being made, rather than by preforming the helix as an independent operation, which must be done with steel wire in order to avoid stresses in the finished hose which would adversely affect the thermoplastic layers.

Figure 6:
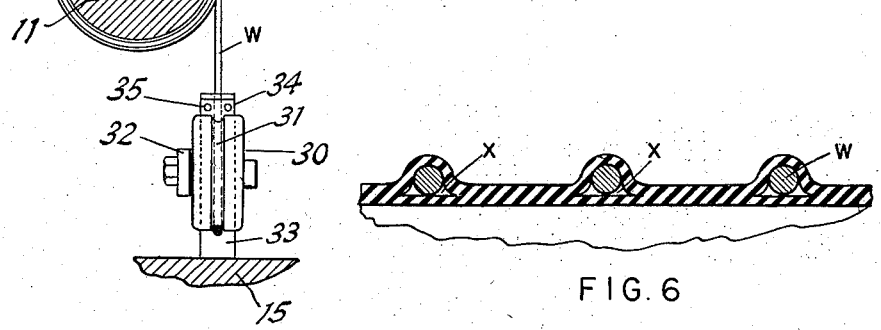
Fig. 6 is a longitudinal sectional view through a portion of the completed hose.

When the mandrel 11 has been wrapped with tape and wire as described above, and the ends thereof have been secured in place adjacent the opposite ends of the mandrel, the mandrel and hose assembly thereon is removed from lathe 12 and placed in an oven having a temperature which will fuse the overlapping portions of tape T into a well integrated walled structure, with the turns of wire W located in tunnel portions X, as shown in Fig. 6.

The oven treatment of the hose assembly on the mandrel 11 also imparts a "set" to the turns of wire W, thereby minimizing any stresses which would adversely affect the enclosing wall structure of the thermoplastic material. On removing the completed hose structure from the mandrel 11, the inner surface thereof will be found to be quite smooth, while deep corrugations on the outer surface will be defined by the successive turns of wire W.

In winding tape T on mandrel 11, in association with wire W, the lateral edges 55, 56 of the tape should be well lapped in the valleys of corrugations 57, as indicated in Fig. 5. Thus, the left hand lateral edges 55 should be located in the axial zone indicated at D in each valley, such zones extending between the center line A—A of the valley and the line C—C passing through the near edge of said valley. The right hand lateral edges 56 should be located in the axial zone indicated at E, of each valley, such zones extending between the center line A—A and the line B—B passing through the far edge of the valley. In some cases, the right hand lateral edges 56 of tape T may be allowed to fall in the axial zones indicated at D.

It is understood that other tape layer combinations may be associated with each turn of wire W, to provide any desired number of tape portions above and below each wire turn. These tape-wire combinations may be provided by suitable axial displacement of the turns of tape T and variation in the basic width of said tape.

Figure 7:
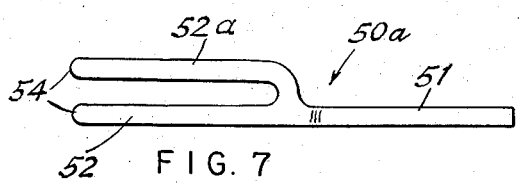
Fig. 7 is a top plan view of an alternative form of tape depressing device.
Figure 8:
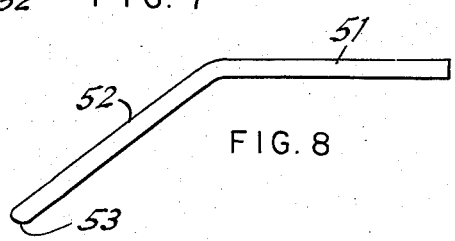
Fig. 8 is a side elevational view thereof.
Figure 9:
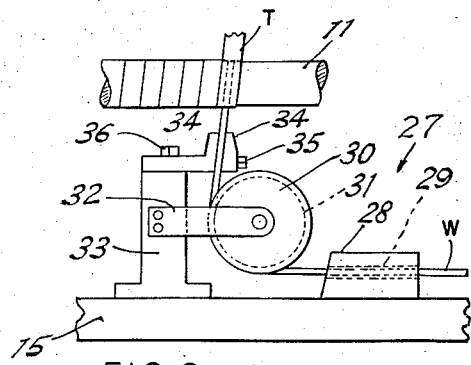
Fig. 9 is a side elevational view of the wire guide means.

Thus, assuming that a hose is to be made in which three layers of tape T are to be disposed over each turn of wire W; then a correspondingly wider tape will be used. Additionally, a modified form of depresser member 50a, shown in Figs. 7, 8, replaces depresser member 50. Member 50a is similar to member 50 except that it includes an additional, downwardly inclined finger portion 52a, parallel to finger portion 52. Member 50a is thus adapted to form two parallel, depressed zones in the tensioned, moving tape T as the same is helically wrapped about mandrel 11. It has been found that the depresser member should have a number of finger portions equal to one less than the number of tape layers disposed over each turn of wire W.

In a typical instance, tape T may be 1⅛" in width, 0.011" in thickness and is fed to mandrel 11 under a uniform tension which reduces the width of the moving tape to 1". The wire W may have a diameter of the order of 0.075 to 0.094" and may be spaced axially at the rate of about 50 turns to the foot. Such arrangement of tape and wire will produce a hose having one layer of tape under each wire turn and two layers of tape over each wire turn. Obviously, the gauge of the tape and the wire diameters may be further varied to suit specific requirements.

As various changes might be made in the embodiments of the invention herein shown, without departing from the spirit thereof, it is understood that all matter herein shown or described shall be deemed illustrative and not by way of limitation except as set forth in the appended claims.

Having thus disclosed my invention, I claim as new and desire to protect by Letters Patent:

1. A flexible hose comprising a helically wound thermoplastic synthetic resin tape with successive convolutions thereof in overlapping relation, a reinforcing wire helix enclosed between the tape convolutions, the inner surface of said hose being smooth and continuous, said tape convolutions being tensioned to radially compress the overlapping convolutions together at points between successive convolutions of said wire helix, the uppermost portions of said tape convolutions being conformed about the top and side portions of the successive convolutions of said wire helix, said tape convolutions being in integrated, fused relation and forming a tunnel for receiving said wire convolutions.

2. A flexible hose comprising a helically wound thermoplastic tape with successive convolutions thereof in helically disposed overlapping relation, a wire helix having the successive convolutions thereof interposed between overlapping portions of said tape, said tape convolutions being in a state of tension to radially compress the overlapping portions together at points between successive convolutions of the wire helix, the portions of said tape above the wire convolutions being conformed about the top and side portions of the wire convolutions, and the superposed portions of said tape convolutions between successive wire convolutions being substantially flattened, the tape convolutions being in integrated, fused relation and the inner surface of said hose being smooth along the circumferential and axial extent thereof.

3. A method of making flexible hose comprising winding thermoplastic tape helically about a cylindrical mandrel, simultaneously winding a reinforcing wire helically and in interleaved relation to the convolutions of said tape, continuously tensioning said tape as the same is wound around the mandrel while continuously depressing an intermediate portion of said tape downwardly out of the plane thereof immediately in advance of the contact of said wire with the tape, whereby the tape convolutions closely conform to the successive convolutions of wire and superposed portions of said tape between the successive convolutions of wire are radially compressed together, and applying heat to said tape and wire assembly to fusibly integrate contacting portions of said tape.

4. A method of making flexible hose comprising feeding a thermoplastic tape under tension to a rotating mandrel to helically wind said tape about said mandrel with successive convolutions thereof in overlapping relation, simultaneously helically feeding a wire into interleaved relation with the overlapping tape portions, and continuously depressing an intermediate portion of the moving tape in advance of the contact thereof with said mandrel whereby to impart a substantially U shaped section to the moving tape for disposition between successive wire convolutions, and applying heat to fuse overlapping portions of said tape together.

5. A method of making flexible hose comprising feeding thermoplastic tape under tension to a rotating mandrel, helically winding said tape about the mandrel with successive convolutions in overlapping relation, helically feeding wire between overlapping portions of said tape, axially spacing the convolutions of said wire helix in relation to the width of said tape to provide a determined number of tape layers above and below the convolutions of the wire helix, depressing an intermediate portion of the moving, tensioned tape in advance of the contact thereof with the mandrel, aligning the depressed portion of the moving tape with the initial portion of the helical space between successive convolutions of wire, and fusing the overlapping, contacting portions of said tape.

6. A machine for making flexible hose from tape and reinforcing wire comprising in combination, a rotatable cylindrical mandrel, means for rotatably supporting said mandrel, means for helically winding tape on said mandrel in overlapped relation, means for helically winding wire between overlapped portions of said tape, and means for continuously deflecting an intermediate portion of the moving tape downwardly out of the plane thereof at a point adjacent said mandrel.

7. A machine for making flexible hose from tape and reinforcing wire, comprising in combination, a rotatable cylindrical mandrel, means for rotatably supporting said mandrel, means for supplying tape under tension to said mandrel, means for helically winding the tensioned tape about said mandrel with portions of successive tape convolutions in overlapping relation, means for feeding wire in interleaved relation to the overlapping portions of said tape convolutions, means for deflecting an intermediate portion of the moving tape out of the plane thereof, and means for mounting said deflecting means in a position adjacent said mandrel and in alignment with the initial portion of the space between successive convolutions of wire.

8. A machine as in claim 7, and further including means for adjusting the position of said deflector means in relation to the axis and circumferential extent of said mandrel.

9. A machine as in claim 7 wherein said deflecting means includes a finger extending towards and at right angles to the axis of said mandrel, the terminal end of said finger being rounded and located adjacent a circumferential portion of said mandrel.

10. A machine as in claim 7 wherein said tape supplying means includes a guide roller adjacent said mandrel, and said deflecting means includes a finger extending toward said mandrel, said finger having a rounded terminal portion located slightly below the plane in which tape passes from said guide roller to said mandrel.

11. A machine as in claim 7 and further including means for stabilizing the axial position of the rotating mandrel at points adjacent the tape supply means.

12. A machine as in claim 11 wherein said stabilizing means comprises a plate swivelly mounted adjacent said mandrel, a pair of rollers mounted on said plate for rotation about vertical axes for receiving the mandrel therebetween, and means for swivelly moving said plate to a position wherein said pair of rollers respectively engage opposite sides of said mandrel and locking said plate in said position.

13. A flexible hose comprising helically wound thermoplastic resin tape with successive convolutions thereof in overlapping relation, a reinforcing wire helix of aluminum alloy enclosed between overlapping portions of said tape, said tape being under tension to radially compress the convolutions thereof to form tunnel portions for receiving the convolutions of said wire helix, contacting portions of said tape being in fused, integrated relation and said wire helix being heat set.

14. A flexible hose comprising helically wound thermoplastic tape with successive convolutions thereof in overlapping relation, a wire helix enclosed between the convolutions of tape, the turns of wire being at a predetermined axial spacing and correlated to the width of the tape to provide a predetermined number of tape layers above and below each turn of wire, portions of said tape convolutions conforming radially about the top and side portions of the turns of wire to form a helical tunnel to receive said wire turns, said superposed tape layers being fusibly integrated together.

15. A hose as in claim 14 wherein the superposed tape layers disposed between successive wire convolutions include on one side thereof a leading tape edge located remotely from one wire convolution and adjacent the next wire convolution and a trailing tape edge located adjacent the first mentioned wire convolution and remotely from the second mentioned wire convolution.

16. In a machine for making flexible hose from thermoplastic tape and reinforcing wire and including a rotatable mandrel, and means for rotatably supporting said mandrel, the improvement comprising tape supply means arranged for axial movement adjacent said mandrel, means for feeding tape from said tape supply means helically about said mandrel with successive convolutions of tape in overlapped relation, means for feeding wire helically in interleaved relation to the overlapping tape convolutions, the wire turns being at a predetermined axial spacing correlated to the width of the tape to provide a determined number of tape layers over each turn of wire, and means for deflecting intermediate portions of the moving tape downwardly out of the plane thereof, said last mentioned means comprising a plurality of parallel arms numbering one less than the number of tape layers over each turn of wire.

17. A flexible hose comprising helically wound thermoplastic tape with successive convolutions thereof in overlapping relation, a wire reinforcement in helical form located between tape convolutions and enclosed by said tape convolutions, superposed layers of said tape extending over the top and side portions of each turn of wire and closely conforming thereto, superposed layers of said tape located between successive turns of wire being substantially flattened in a longitudinal direction between said turns of wire, said superposed layers of tape being integrated together.

18. A flexible hose comprising helically wound synthetic resin tape with successive convolutions thereof in overlapping relation, a helical wire reinforcement located between superposed tape layers, the tape layers overlying the wire turns closely conforming to the top and side portions of said wire turns, the superposed tape layers at points between successive wire turns including at least one intermediate layer spanning at least two successive wire turns and a pair of outermost layers having respective edge portions located adjacent the two successive wire turns respectively, said layer edge portions being in overlapping relation between said pair of successive wire turns, said tape convolutions having the superposed layers thereof in integrated relation.

References Cited in the file of this patent

UNITED STATES PATENTS

| | | |
|---|---|---|
| 2,688,343 | Cuddeback | Sept. 7, 1954 |
| 2,707,491 | Harris | May 3, 1955 |